(12) United States Patent
Miyamoto et al.

(10) Patent No.: US 9,298,534 B2
(45) Date of Patent: Mar. 29, 2016

(54) MEMORY SYSTEM AND CONSTRUCTING METHOD OF LOGICAL BLOCK

(71) Applicant: Kabushiki Kaisha Toshiba, Minato-ku (JP)

(72) Inventors: Arata Miyamoto, Ota-ku (JP); Hiroshi Yao, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 94 days.

(21) Appl. No.: 14/193,452

(22) Filed: Feb. 28, 2014

(65) Prior Publication Data

US 2015/0067415 A1    Mar. 5, 2015

Related U.S. Application Data

(60) Provisional application No. 61/874,179, filed on Sep. 5, 2013.

(51) Int. Cl.
*H04L 1/20*    (2006.01)
*G06F 11/07*    (2006.01)

(52) U.S. Cl.
CPC ............ *G06F 11/076* (2013.01); *G06F 11/073* (2013.01)

(58) Field of Classification Search
CPC ........................................................ H04L 1/20
USPC .................... 714/704, 718, 747, 758, 773
See application file for complete search history.

(56) References Cited

U.S. PATENT DOCUMENTS

| | | | |
|---|---|---|---|
| 8,041,884 B2 * | 10/2011 | Chang | 711/103 |
| 8,452,929 B2 * | 5/2013 | Bennett | 711/162 |
| 8,533,406 B2 * | 9/2013 | Flynn et al. | 711/154 |
| 8,687,421 B2 * | 4/2014 | Avila et al. | 365/185.11 |
| 2008/0140918 A1 | 6/2008 | Sutardja | |
| 2011/0238890 A1 | 9/2011 | Sukegawa | |
| 2012/0163074 A1 | 6/2012 | Franca-Neto et al. | |

* cited by examiner

*Primary Examiner* — Fritz Alphonse
(74) *Attorney, Agent, or Firm* — Oblon, McClelland, Maier & Neustadt, L.L.P.

(57) ABSTRACT

According to one embodiment, a memory system includes a bit-error-rate manager configured to manage information associated with a bit error rate for each physical block, a logical-block constructing unit configured to construct a logical block based on the information associated with the bit error rate, and a block manager configured to manage the correspondence between the logical block constructed by the logical-block constructing unit and the physical blocks. The logical block is a collection of a plurality of physical blocks.

18 Claims, 10 Drawing Sheets

MEMORY SYSTEM AND CONSTRUCTING METHOD OF LOGICAL BLOCK

CROSS-REFERENCE TO RELATED APPLICATIONS

This application is based upon and claims the benefit of priority from U.S. Provisional Patent Application No. 61/874,179, filed on Sep. 5, 2013; the entire contents of which are incorporated herein by reference.

FIELD

Embodiments described herein relate generally to a memory system for controlling a non-volatile semiconductor memory and to a constructing method of logical block.

BACKGROUND

A storage using a flash memory is equipped with a plurality of memory chips, and drives the plurality of memory chips in parallel so as to improve data transfer performance. From the respective memory chips, physical blocks are collected to construct a virtual block of a logical block using the plurality of collected physical blocks. The logical block is a unit of management for erasing, wear leveling, and the like. From the respective physical blocks configuring the logical block, physical pages are selected. The plurality of selected physical pages configures a unit of management referred to as a logical page. The logical page is a write unit on a memory system. Constructing the logical block for driving the plurality of physical blocks in parallel speeds up the data transfer. Similarly, constructing the logical page for driving the plurality of physical pages in parallel speeds up the data transfer.

DETAILED DESCRIPTION

In general, according to one embodiment, a memory system includes a non-volatile memory and a controller. The non-volatile memory includes a plurality of memory chips. Each of the memory chips includes a plurality of physical blocks. The physical block is a unit of erasing. The controller controls the non-volatile memory. The controller includes a bit-error-rate manager, a logical-block constructing unit, and a block manager. The bit-error-rate manager manages information associated with a bit error rate for each physical block. The logical-block constructing unit constructs a logical block based on the information associated with the bit error rate. The logical block is a collection of the plurality of physical blocks. The block manager manages a correspondence between a logical block constructed by the logical-block constructing unit and physical blocks.

Exemplary embodiments of a memory system and a constructing method of logical block will be explained below in detail with reference to the accompanying drawings. The present invention is not limited to the following embodiments.

First Embodiment

Figure 1:
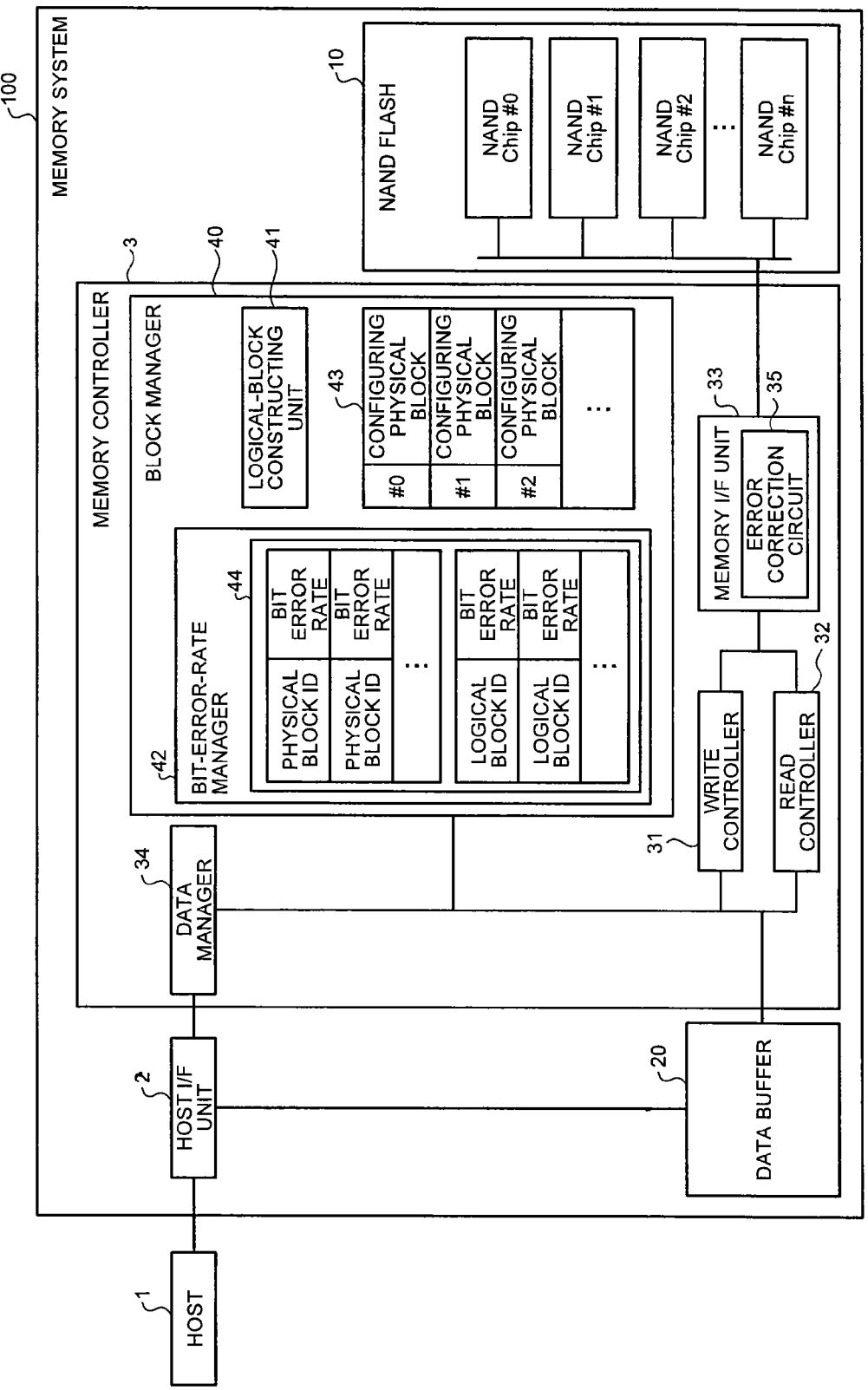
FIG. 1 is a functional block diagram illustrating an internal configuration of a memory system according to a first embodiment.

FIG. 1 illustrates an example of a configuration of a memory system 100. The memory system 100 connected through a host interface unit 2 to a host device (hereinafter, simply referred to as a host) 1, and functions as an external memory of the host 1. The host 1 is, for example, a personal computer, a portable phone, and an imaging device, or the like.

The memory system 100 includes the host I/F unit 2, a NAND flash 10 (hereinafter abbreviated as a NAND) as a non-volatile memory, a memory controller 3, and a data buffer 20. The memory controller 3 includes a write controller 31, a read controller 32, a memory interface unit 33, a data manager 34, and a block manager 40. The block manager 40 includes a logical-block constructing unit 41, a bit-error-rate manager 42, and a logical-block management table 43. The bit-error-rate manager 42 includes a bit-error-rate management table 44. The non-volatile memory is not limited to a non-volatile semiconductor memory such as the NAND flash 10. Any non-volatile memory is applicable insofar as the memory is capable of storing data, for example, a resistance random access memory (ReRAM) and a ferroelectric random access memory (FeRAM).

The NAND 10 stores user data transmitted from the host 1, management information of the memory system 100, system data and the like. The NAND 10 is constituted of a plurality of memory chips #0 to #n. The memory chips #0 to #n each includes a memory cell array where a plurality of memory cells is arrayed in a matrix. Each memory cell is capable of multilevel storage. The memory chips #0 to #n each includes a plurality of physical blocks as a unit of data erasing. In each of the memory chips #0 to #n, data write and data read are performed for each physical page G. A physical block is configured of a plurality of the physical pages G.

The host I/F unit 2 receives commands such as a read command and a write command from the host 1 through a communication interface such as SATA (Serial Advanced Technology Attachment), a SAS (Serial Attached SCSI) and the like. An address of data, size, data and the like to be transferred by the command is added to the command. When a command is received from the host 1, the host I/F 2 secures necessary buffer region on the data buffer 20, and notifies the command to the memory controller 3.

The data buffer 20 temporarily stores data transferred to and from the host 1. As the data buffer 20, for example, SRAM (Static Random Access Memory), or DRAM (Dynamic Random Access Memory) is used.

The memory controller 3 performs processings such as reading and writing on the NAND 10 according to commands notified from the host I/F unit 2. Further, the memory controller 3 performs storage location management for managing positions where the data is to be stored in the NAND 10, and block management of managing which blocks are to be used to store the data.

In the memory system 100, logical blocks that are virtual blocks are used as managing units of the blocks. In this embodiment, the logical block is configured by a plurality of physical blocks with similar reliability. The logical page is formed by selecting respective single physical pages from the plurality of physical blocks configuring the logical block. In case of writing to the NAND 10, the memory controller 3 performs writing in a unit of the logical page. The memory controller 3 performs an erase processing in a unit of the logical block of the NAND 10. For example, the logical page is formed by selecting respective physical pages with the same page number from the plurality of physical blocks configuring the logical block. The constructing method of the logical block will be described in detail below.

The physical blocks include an unusable defective block (hereinafter referred to as a bad block), which does not work correctly due to various factors, and a usable normal block, which works correctly. The logical block is constructed of the normal blocks. The bad block may occur due to congenital causes at the production stage, and may occur due to acquired causes during the use of the NAND 10, for example, during data read or during data write.

Figure 2:
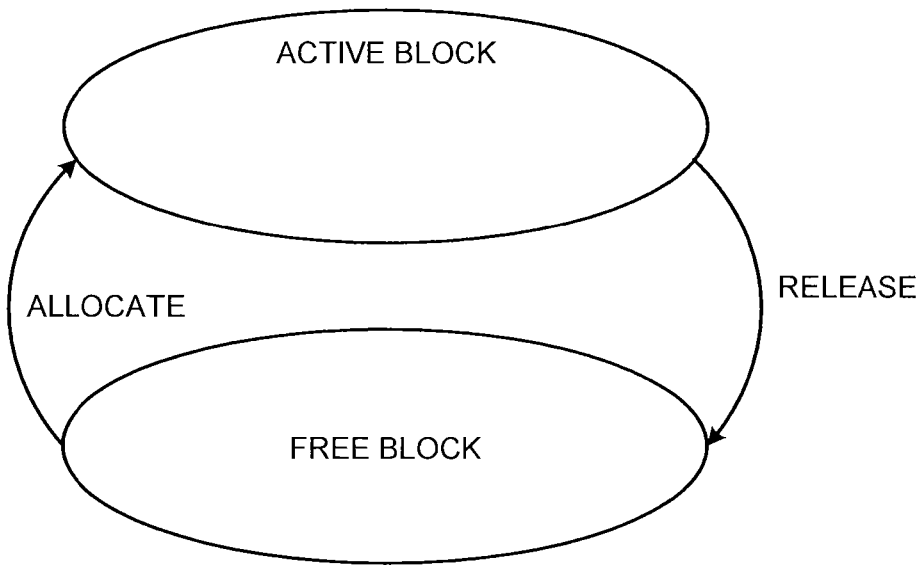
FIG. 2 is a diagram illustrating state transitions of a logical block.

The states of each logical block include two states of an active state and a free state. The logical block where valid data is recorded is referred to as an active block. A logical block where valid data is not recorded and that is reusable after being erased is referred to as a free block. FIG. 2 illustrates state transitions of each logical block. When a new logical block is necessary to record data, a logical block is allocated from a collection of free blocks. The allocated logical block transitions to an active block. After a part of data or data corresponding to the capacity of the active block is recorded in the active block, the data with the logical address to which new data is overwritten by the host 1 or the data copied to another block for compaction becomes invalid data. As a result, the block where the valid data in the active block is confirmed to be zero is released for reuse and then transitions from the active block to a free block.

In FIG. 1, the data manager 34 performs storage location management for managing the location to be stored of the data in the NAND 10. The data manager 34 includes an address translation table for managing the correspondence between a logical address provided by the host 1 and a physical location in the NAND 10, and performs organization such as compaction of the NAND 10 in accordance with the usage conditions of the blocks in the NAND 10. In the organization of the NAND 10, the valid data in a plurality of blocks including the invalid data is collected, and the collected data is rewritten to another block, thus ensuring a free block.

The read controller 32 performs a read processing from the NAND 10 in accordance with control by the memory controller 3. The read controller 32 obtains the physical location in the NAND 10 corresponding to the logical address of the read data from the address translation table managed by the data manager 34 and then notifies the memory I/F unit 33 of the obtained physical location, so as to perform the read processing.

The write controller 31 performs a write processing to the NAND 10 in accordance with control by the memory controller 3. The write controller 31 obtains the location information on a plurality of physical blocks belonging to the logical block to which the data is to be written, from the block manager 40. The write controller 31 outputs the obtained location information of the physical blocks from the block manager 40 and the data read from the data buffer 20 to the memory I/F unit 33, so as to perform the write processing. The write controller 31 issues a write-completion notification to the data manager 34. Accordingly, the address translation table managed by the data manager 34 is updated.

The memory I/F unit 33 is a controller for directly controlling the NAND 10 in accordance with the control protocol of the NAND 10, and includes an error correction circuit (the ECC circuit) 35 and the like. The memory I/F unit 33 writes the temporarily-stored data in the data buffer 20 to the NAND 10 in accordance with the control by the write controller 31 and the like. The memory I/F unit 33 reads out the data stored in the NAND 10 in accordance with the control by the read controller 32 and the like, and transfers the data to the data buffer 20. The error correction circuit 35 performs an encode processing in an ECC processing (error correction processing) on the data written to the NAND 10, and adds the encode result to the data. The error correction circuit 35 performs decode processing (error correction processing with error-correcting codes) in the ECC processing on the data read out from the NAND 10.

The block manager 40 performs management of the blocks in the NAND 10. The block manager 40 includes the logical-block constructing unit 41, the bit-error-rate manager 42, the logical-block management table 43, and the bit-error-rate management table 44.

The bit-error-rate management table 44 holds the bit error rate for each logical block and the bit error rate for each physical block. The bit-error-rate management table 44 also includes a region that temporarily holds the bit error rate of a sample-target physical page described later. The bit error rate corresponds to a value obtained by dividing the number of bit errors by the number of data bits.

The bit-error-rate manager 42 calculates the respective bit error rates of the physical blocks and the respective bit error rates of the logical blocks to register the calculated bit error rates in the bit-error-rate management table 44. A bit error rate of the physical block is calculated based on the bit error rates of a plurality of physical pages that configures the physical block. A bit error rate of the physical page is a value obtained by dividing the number of error bits that have occurred in the data written to the physical page by the number of bits in this data. However, it is not necessary to calculate the bit error rates of all the physical pages that configure the physical blocks. It is only necessary to calculate the bit error rates of one or multiple specific physical pages that are preliminarily selected as sampling targets. For example, the bit error rates of a plurality of physical pages of the sampling targets are obtained. The average value or the maximum value of these bit error rates in the sampling targets is set as the bit error rate of the physical block. The obtained bit error rates of the physical pages of the sampling targets are temporarily held in the bit-error-rate management table 44. At the point when calculation of the bit error rates of all the physical pages selected as the sampling targets is completed, the bit error rates of the physical blocks including these physical pages are calculated and then registered on the bit-error-rate management table 44 or updated.

Similarly, the bit error rate of the logical block is obtained by calculating the bit error rates of all the physical blocks that configure the logical block, and then calculating the average value or the maximum value of the calculated bit error rates of all the physical blocks.

The bit error rate can be calculated by an error correction circuit (not illustrated) disposed in the NAND 10, can be calculated by the error correction circuit 35 disposed in the memory controller 3, and can be calculated by the bit-error-rate manager 42.

In the case where the NAND 10 includes an error correction circuit, the error correction circuit in the NAND 10 stores the number of corrected bits for each physical page. The bit-error-rate manager 42 obtains the number of corrected bits stored in the error correction circuit, calculates the bit error rate from the number of corrected bits and the number of data bits, and saves the calculated bit error rate in the bit-error-rate management table 44.

In case of using the error correction circuit 35 disposed in the memory controller 3, the error correction circuit 35 notifies the bit-error-rate manager 42 of the number of corrected bits for each physical page. The bit-error-rate manager 42 calculates the bit error rate from the notified number of corrected bits, and saves the calculated bit error rate in the bit-error-rate management table 44.

In the case where the bit-error-rate manager 42 calculates the bit error rate, the bit-error-rate manager 42 stores the true values of data to be written to the physical page. When the bit error rate needs to be calculated, the bit-error-rate manager 42 reads out data from the corresponding physical page, compares the stored true value of the data with the read data so as to obtain the number of bit errors, and calculates a bit error rate from the obtained number of bit errors and the number of data bits.

The logical-block management table 43 holds the management information on each logical block. The management information includes, for example, the following information for each logical block.

Identification information (physical block number) of the plurality of physical blocks that configures the logical block Usage state (identification information indicative of an active block or a free block)

The number of erasure (erase count, number of times of erasing)

Figure 3:
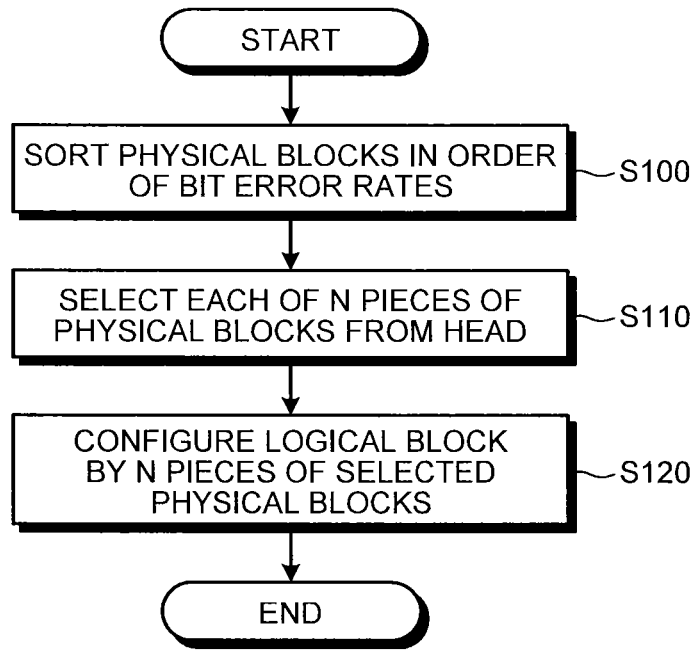
FIG. 3 is a process diagram illustrating a logical-block construction procedure according to the first embodiment.

The logical-block constructing unit 41 selects a plurality of physical blocks for constructing a logical block based on the bit error rates of the respective physical blocks stored in the bit-error-rate management table 44. The logical-block constructing unit 41 constructs a logical block such that the physical blocks with similar bit error rates are included in the same logical block. For example, as illustrated in FIG. 3, the logical-block constructing unit 41 sorts all the physical blocks included in the NAND 10 in the order of bit error rates (in step S100), sequentially selects physical blocks from the head of the sorted list in a unit of the number (N pieces) of the physical blocks that configure a logical block (in step S110), and configures the logical block that includes respective sets of the selected physical blocks of N pieces each (in step S120). In the case where the plurality of physical blocks in the same memory chip is proved to have similar bit error rates, the logical block may be configured by a plurality of physical blocks in the same memory chip.

The logical-block constructing unit 41 constructs a logical block from physical blocks (normal blocks) other than bad blocks, for example, at the first time of power on at the production stage. As described above, the bad block may occur due to congenital causes at the production stage, and may occur due to acquired causes during the use of the NAND 10. Therefore, the logical-block constructing unit 41 may execute a reconstruction processing of the logical block at appropriate time, for example, at the point when the margin capacity (Overprovisioning) falls below a threshold value, even when the memory system 100 is used.

Regarding the NAND 10 immediately after the production, there is no information on the bit error rates. This does not allow constructing a logical block based on bit error rates as described above. Therefore, at the point before a logical block is first configured, for example, at the time of initial startup of the memory system 100 during the production process, the memory controller 3 writes dummy data to all the physical blocks, reads out the data from all the physical blocks subjected to the writing, and compares the write data and the read data so as to calculate the number of bit errors. The memory controller 3 calculates the bit error rate from the calculated number of bit errors and the number of data bits, and registers the calculated bit error rate of each physical block in the bit-error-rate management table 44. Subsequently, a logical block is constructed using the registered data in the bit-error-rate management table 44. The dummy data may be written to one or a plurality of specific physical pages preliminarily selected as sampling targets as described above so as to calculate the bit error rates of all the physical pages. Subsequently, the number of bit errors of the physical block may be calculated based on the calculated bit error rates of the physical pages of the sampling targets.

Another method may be used to calculate the bit error rate. In the other method, one or a plurality of physical blocks of sampling targets is selected from the same memory chip based on prior information that a plurality of physical blocks belonging to the same memory chip has similar bit error rates. Subsequently, similarly to the above description, dummy data is written to the selected physical blocks of the sampling targets. The written dummy data is used to calculate the bit error rates of one or the plurality of physical blocks of the sampling targets. Subsequently, based on the calculated bit error rates of the physical blocks of the sampling targets, the bit error rate of the non-sampling target physical blocks belonging to the same memory chip are predictively calculated.

Figure 4:
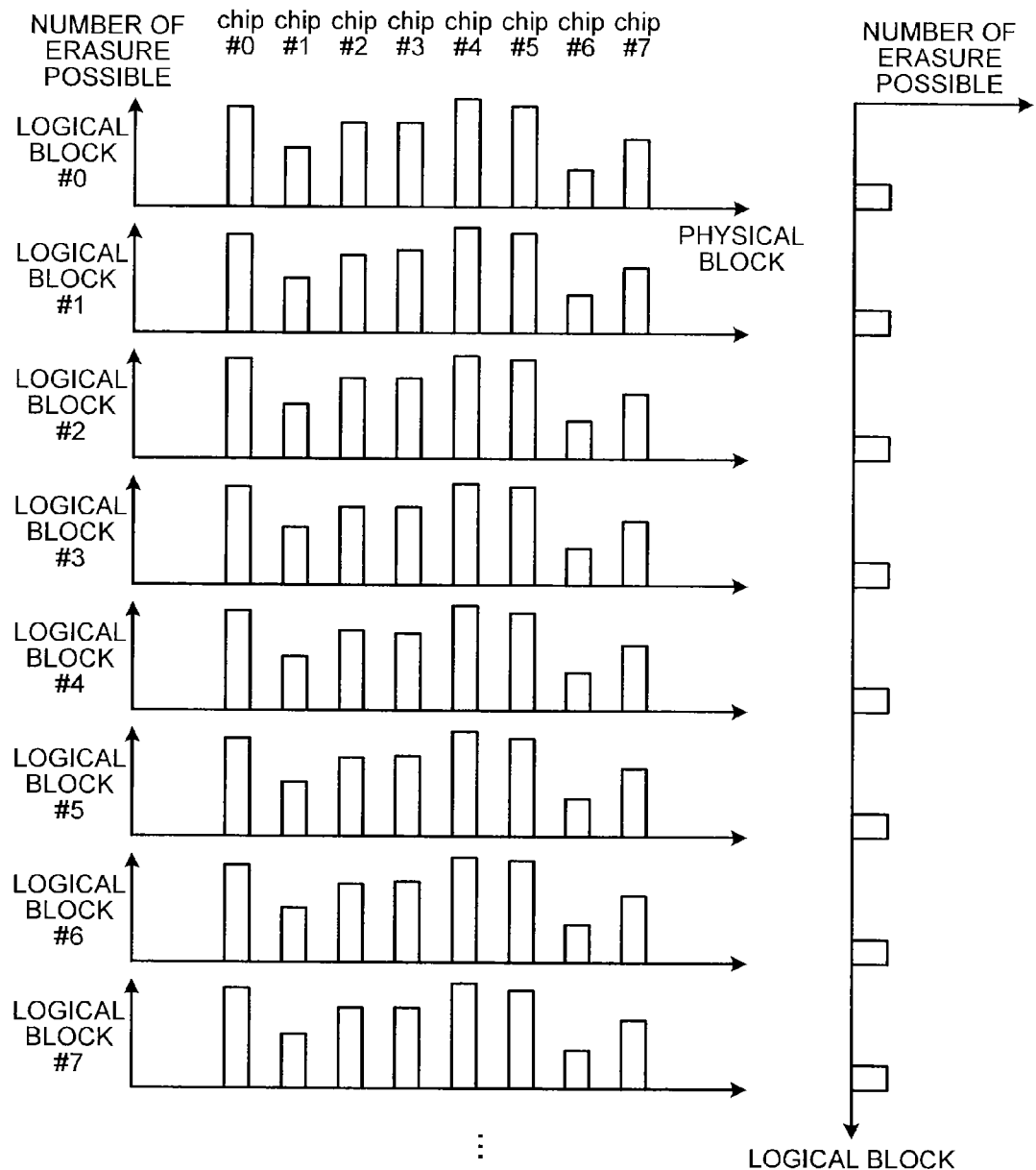
FIG. 4 is a diagram illustrating a distribution of the number of erasure possible of respective physical blocks in a logical block and a distribution of the number of erasure possible in a unit of the logical block according to a comparative example.

FIG. 4 illustrates the difference in the number of erasure (that is) possible among the respective physical blocks within the logical block and the difference in the number of erasure possible among the respective logical blocks in a comparative example. The number of erasure possible is the number of erase processings that can be performed after the logical block is configured before the physical block reaches the end of its lifespan (the predicted number). In the comparative example, the physical blocks are selected from the respective memory chips one by one to configure the logical block, so as to improve parallel accessibility. The number of erasure possible shows reliability information on the physical block. The reliability increases with increasing the number of erasure possible. In FIG. 4, variation in reliability is larger among the memory chips rather than among the physical blocks within the same memory chip. Accordingly, variation in the number of erasure possible becomes larger among the physical blocks within the same logical block. The lifespan of the logical block is dependent on the lifespan of the physical block with the shortest lifespan within the logical block. Accordingly, the lifespan of each logical block is dependent on the lifespan of the physical block in the memory chip #6 with low reliability.

Figure 5:
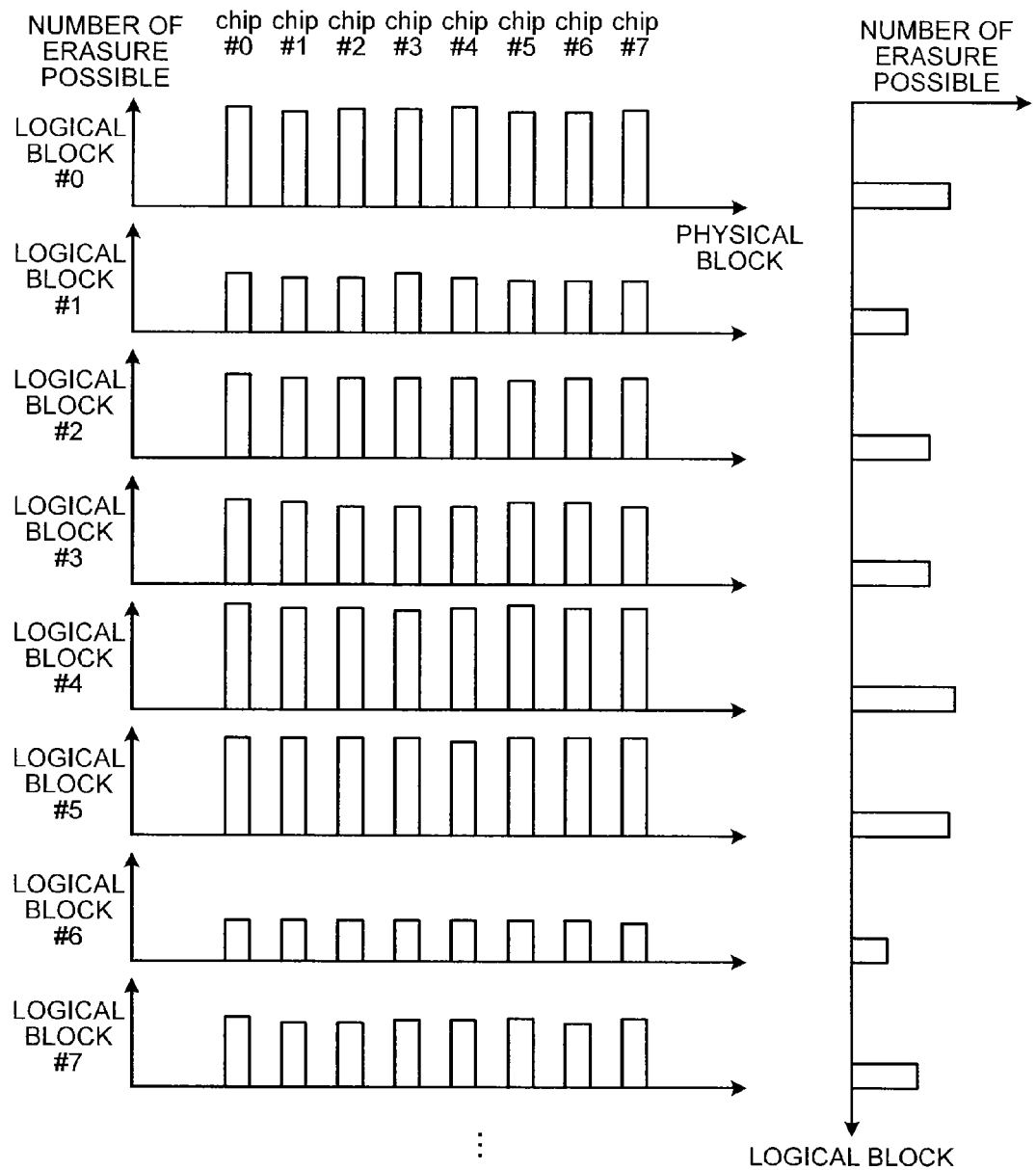
FIG. 5 is a diagram illustrating a distribution of the number of erasure possible of respective physical blocks in a logical block and a distribution of the number of erasure possible in a unit of the logical block according to the first embodiment.

FIG. 5 illustrates the difference in the number of erasure possible among the respective physical blocks within the logical block and the difference in the number of erasure possible among the logical blocks in the case where the logical block is constructed using a method according to the first embodiment. Each logical block is constructed by a plurality of physical blocks with similar reliability, that is, with similar number of erasure possible. It is difficult to directly measure the number of erasure possible as the index of reliability. Therefore, in this embodiment, the bit error rate of the physical block is used as the index of reliability.

In the case where a logical block is configured by a plurality of physical blocks with similar reliability, all the physical blocks fail approximately at the same timing. Accordingly, the lifespan of the logical block is not dragged down by the physical block with short lifespan. However, in the case where the logical block is thus configured, variation in reliability exists among the respective physical blocks within the logical block is shifted to variation in reliability among the logical blocks as illustrated in FIG. 4. That is, the number of erasure possible (the number of times of rewriting possible) before failure differs considerably for each logical block.

Accordingly, in case of using the method according to the first embodiment in which the logical block is constructed by the plurality of physical blocks with the similar bit error rates, as described in the following embodiment, employing wear leveling using the bit error rate as a leveling target is preferred.

Thus, in the first embodiment, the logical block is constructed by the plurality of physical blocks with the similar bit error rates. In other words, a first logical block is constructed by a plurality of first physical blocks with low bit error rates while a second logical block is constructed by a plurality of second physical blocks with higher bit error rates than the bit error rates of the first physical blocks. The physical blocks with the similar bit error rates have the similar number of erasure possible. This ensures approximately the same timing of failure for each physical block within the logical block. This reduces lifespan loss occurring due to the restricted lifespan of the logical block by the physical block with the short lifespan, thus increasing the total amount of writable data before system failure.

In the case where the NAND 10 is a multi-level cell (MLC), a page with a larger increased amount of bit error rate among an upper page and a lower page is preferred to be a physical page to be a sampling target for calculating the bit error rate. In the case where there is a difference in increased amount of the bit error rate in association with the increase in the number of erasing times between the upper page and the lower page, using the value of the page with the larger increased amount of the bit error rate increases the variation range of the bit error rate among the physical blocks. This allows accurately comparing the extent of the wear degree among the logical blocks and the wear degree among the physical blocks. In the case where the NAND 10 is a triple-level cell (TLC), among an upper page, a middle page, and a lower page, a page with a larger increased amount of the bit error rate is preferred to be a physical page to be a sampling target for calculating the bit error rate for a similar reason.

While in this embodiment the "bit error rate" is used as the index of reliability for the physical pages, the physical blocks, and the logical blocks, the "number of error bits" may be used. In this case, the bit-error-rate manager 42 manages the number of error bits for each physical block. The logical-block constructing unit 41 constructs a logical block based on the number of error bits of each physical block. That is, the logical-block constructing unit 41 constructs a logical block such that physical blocks with the similar numbers of error bits are included in the same logical block. The number of error bits of the physical block is calculated based on the number of error bits of the plurality of physical pages configuring the physical block. The number of error bits of the physical page is the number of error bits occurring in the data written to this physical page. Also in the following embodiment, the "bit error rate" can be similarly replaced by the "number of error bits".

Second Embodiment

In the first embodiment, constructing a logical block does not make it a condition that the same number of physical blocks are collected from each memory chip so as to configure the logical block. Accordingly, the first embodiment does not necessarily ensure parallel accessibility.

Figure 6:
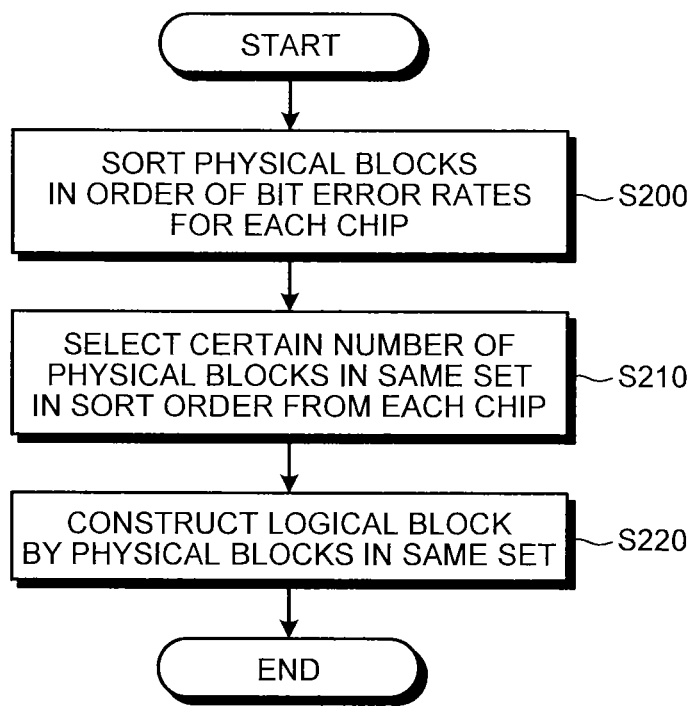
FIG. 6 is a process diagram illustrating a logical-block construction procedure according to a second embodiment.

Therefore, in the second embodiment, the logical block is constructed to minimize the variation in bit error rate among the respective physical blocks within the logical block in a range that ensures parallel accessibility. FIG. 6 illustrates a logical-block construction procedure according to the second embodiment.

The logical-block constructing unit 41 sorts the physical blocks in the order corresponding to the bit error rates based on the bit-error-rate management table 44 for each memory chip (in step S200). Subsequently, the logical-block constructing unit 41 selects a certain number (for example, one, two, or similar number) of physical blocks as one set in the sorted order from each memory chip (in step S210). The logical-block constructing unit 41 constructs a logical block by the plurality of physical blocks included in the selected set (in step S220).

For example, in the case where the logical block is configured by taking out physical blocks one by one from each the memory chips, one physical block with the highest bit error rate is selected from each of the memory chips so as to configure the logical block, one physical block with the second highest bit error rate is selected from each of the memory chips so as to configure the logical block, one physical block with the third highest bit error rate is selected from each of the memory chips so as to configure the logical block, and so on.

The second embodiment can reduce the variation in bit error rate among the physical blocks within the logical block within a range that suffices parallel accessibility with respect to the memory chips. In the case where the reliability variation among the physical blocks within the same memory chip is larger than the reliability variation among the memory chips, this method can sufficiently reduce the bit error rate variation among the physical blocks within the logical block.

Third Embodiment

Figure 7:
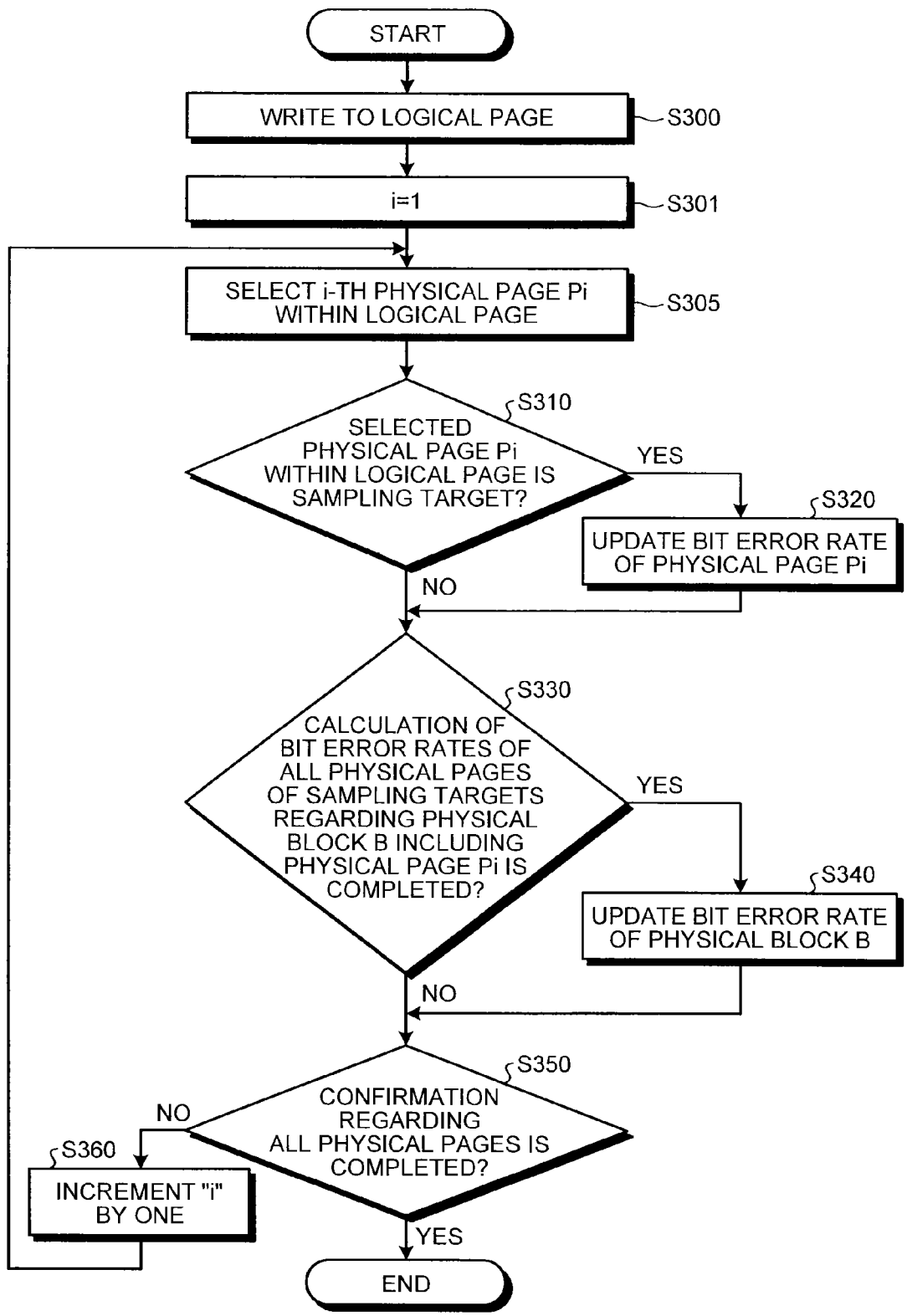
FIG. 7 is a flowchart illustrating a calculation procedure of a bit error rate of the physical block.

In a third embodiment, the timing for calculating the bit error rate of the physical page by the bit-error-rate manager 42 is limited to the timing immediately after writing to this physical page occurs. FIG. 7 is a flowchart illustrating a calculation procedure of the bit error rates of the physical page and the physical block in the third embodiment. When the write processing to the logical page occurs (in step S300), the bit-error-rate manager 42 sets i=1 (in step S301). Subsequently, the bit-error-rate manager 42 selects the i-th (in this case, the first) physical page Pi within the logical page where writing has occurred (in step S305). The bit-error-rate manager 42 determines whether or not the selected physical page Pi is the sampling target (in step S310). The bit-error-rate manager 42 stores the physical page number of the sampling target.

In the case where the physical page Pi is the sampling target, the bit-error-rate manager 42 obtains the bit error rate of the physical page Pi with the method described in first embodiment, and updates the bit error rate value of the corresponding physical page Pi in the bit-error-rate management table 44 with the obtained bit error rate (in step S320).

Subsequently, the bit-error-rate manager 42 determines whether or not the calculation of the bit error rates of all the physical pages of the sampling targets included in a physical block B is completed regarding the physical block B including the selected physical page Pi (in step S330). In the case where the calculation is completed, the bit-error-rate manager 42 calculates the bit error rate of the physical block B based on the bit error rates of all the physical pages of the sampling targets included in the physical block B. With this calculated value, the bit-error-rate manager 42 updates the bit error rate value of the physical block B in the bit-error-rate management table 44 (in step S340).

In the case where the determination in step S330 is NO, or after step S340 is completed, the bit-error-rate manager 42 determines whether or not the confirmation as to whether or not the physical page is the sampling target is completed, regarding all the physical pages included in the logical page in which writing has occurred (in step S350). In the case where this determination is NO, the bit-error-rate manager 42 increments "i" by one and repeatedly executes the processing from step S310 to S340 on all the physical pages within the logical page in which writing has occurred.

In the third embodiment, when writing to the logical page occurs, the bit error rate of the physical page of the sampling target is calculated. This allows efficiently calculating the bit error rate in a short calculation time period.

Fourth Embodiment

In a fourth embodiment, the physical pages of the sampling targets are distributedly arranged in the respective physical blocks such that only one physical page of the sampling target is set within the same logical page. This prevents the calculations of the bit error rates for a plurality of physical pages within the same logical page from occurring at the same timing. However, in the case where the number of memory chips is smaller than the number of physical blocks that configure the logical block, up to two physical blocks or else up to four physical blocks may be accepted as the samples.

Figure 8:
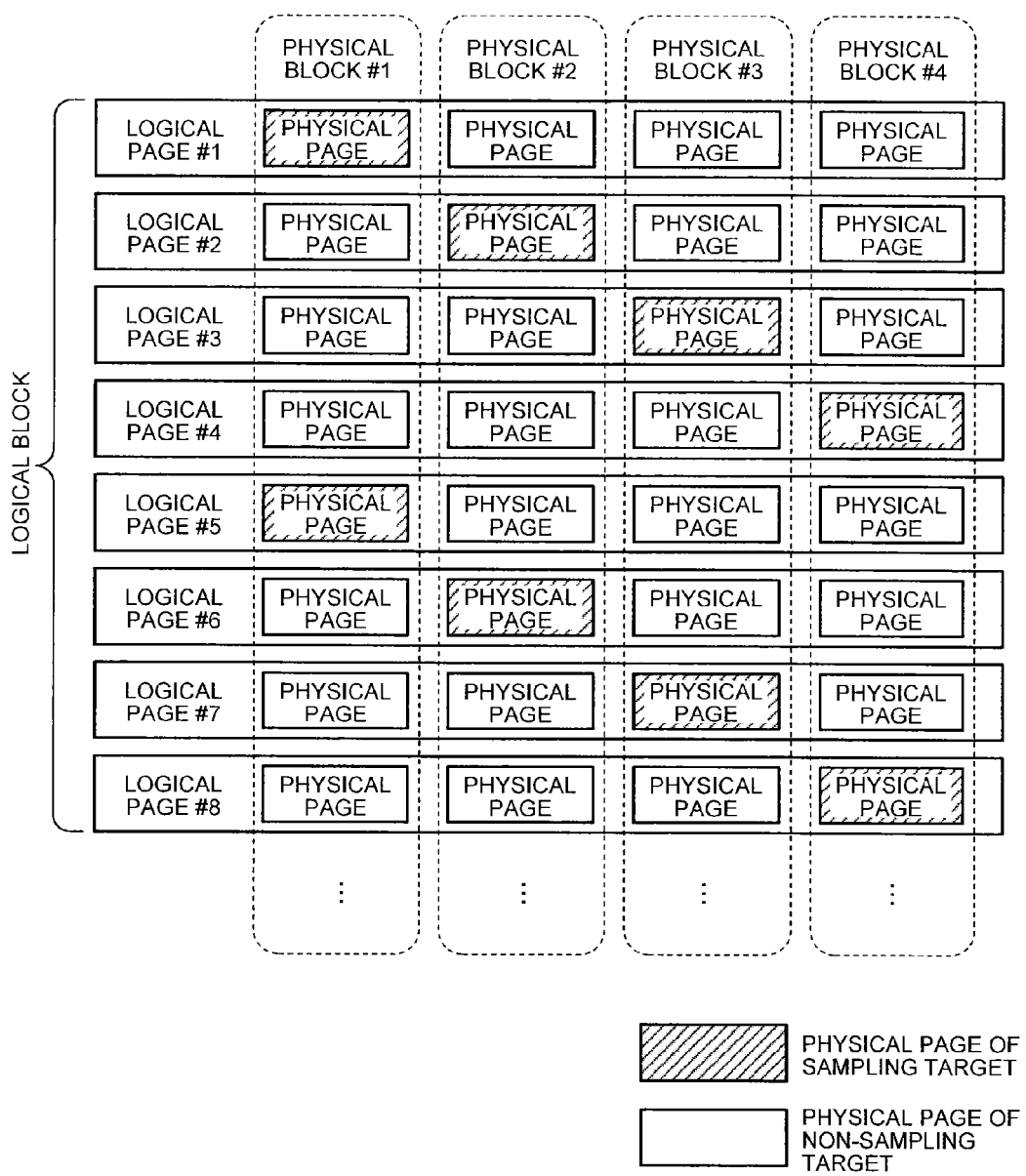
FIG. 8 is a diagram illustrating an exemplary setting of physical pages of sampling targets.

FIG. 8 illustrates one example of arrangement of the physical pages of the sampling targets to be calculation targets for the bit error rate. In this diagram, the logical page is configured by four physical blocks. In each physical block, one physical page every four physical pages is the sampling target. The hatched physical page illustrates the sampling target for bit error rate calculation. The sample-target physical page in each physical block is not selected from the same logical page as that of the sampling targets in the other physical blocks. For example, a physical block #1 includes physical pages included in a logical page #1 and a logical page #5 as the sampling targets. The sample-target physical pages in physical blocks #2, #3, and #4 are not included in any of the logical page #1 and the logical page #5.

In the fourth embodiment, only one physical page of the sampling target is set within the same logical page. This prevents the occurrence of the calculations of the bit error rates with respect to a plurality of physical pages at the same timing, thus distributing the calculation time periods of the bit error rate. Also, this reduces the size of the temporal buffer storing the true value of data required for computation of the bit error rate.

Fifth Embodiment

In a fifth embodiment, until the rest of lifespan of the memory system 100 becomes equal to or less than a certain length after the beginning from the start of use of the memory system 100, the logical block is constructed with a priority on the parallel accessibility. For example, one logical block includes the same number of physical blocks within the respective memory chips. Subsequently, when the rest of lifespan of the memory system 100 becomes equal to or less than the certain length, the logical block is reconstructed by a plurality of physical blocks with similar bit error rates.

Methods for predicting the lifespan of the memory system 100 include, for example, a method for determining that the rest of lifespan is short in the case where the average bit error rate of all the logical blocks is equal to or more than a threshold value. Alternatively, there is also a method for selecting the certain number of logical blocks with upper bit error rates and determining whether or not the average bit error rate of these blocks exceeds the threshold value so as to determine whether or not the rest of lifespan becomes equal to or less than the certain length. When the certain number of logical blocks fail and the margin capacity becomes insufficient, the memory system is determined to have reached the end of its lifespan. Therefore, the lifespan of the memory system is dependent on the lifespan of the logical block with a high bit error rate. In the case where wear leveling is sufficiently performed, the difference between both lifespans is small. Otherwise, writing and erasing are concentrated on a part of the logical block. Accordingly, the latter method has higher accuracy as the index for estimating the lifespan.

The logical block is reconstructed using the plurality of physical blocks included in the plurality of logical blocks in the active block list. The logical block is also reconstructed using the plurality of physical blocks included in the plurality of logical blocks in the free block list. That is, the plurality of physical blocks included in the plurality of logical blocks in the active block list and the plurality of physical blocks included in the plurality of logical blocks in the free block list are not combined to reconstruct the logical block. It is not necessary to simultaneously reconstruct all the logical blocks at once. For example, a certain number of unreconstructed logical blocks are selected at regular intervals so as to perform reconstruction among these logical blocks. Also, there is a method for repeating this operation before the completion of the reconstruction of all the logical blocks.

The fifth embodiment can improve the data access speed as a logical block configuration having a priority on the parallel accessibility at the beginning of the operation of the system. When the system reaches the end of its lifespan, the logical block is reconfigured by a plurality of physical blocks with similar bit error rates. Although parallel accessibility is sacrificed, this can prolong the remaining lifespan.

Sixth Embodiment

Figure 9:
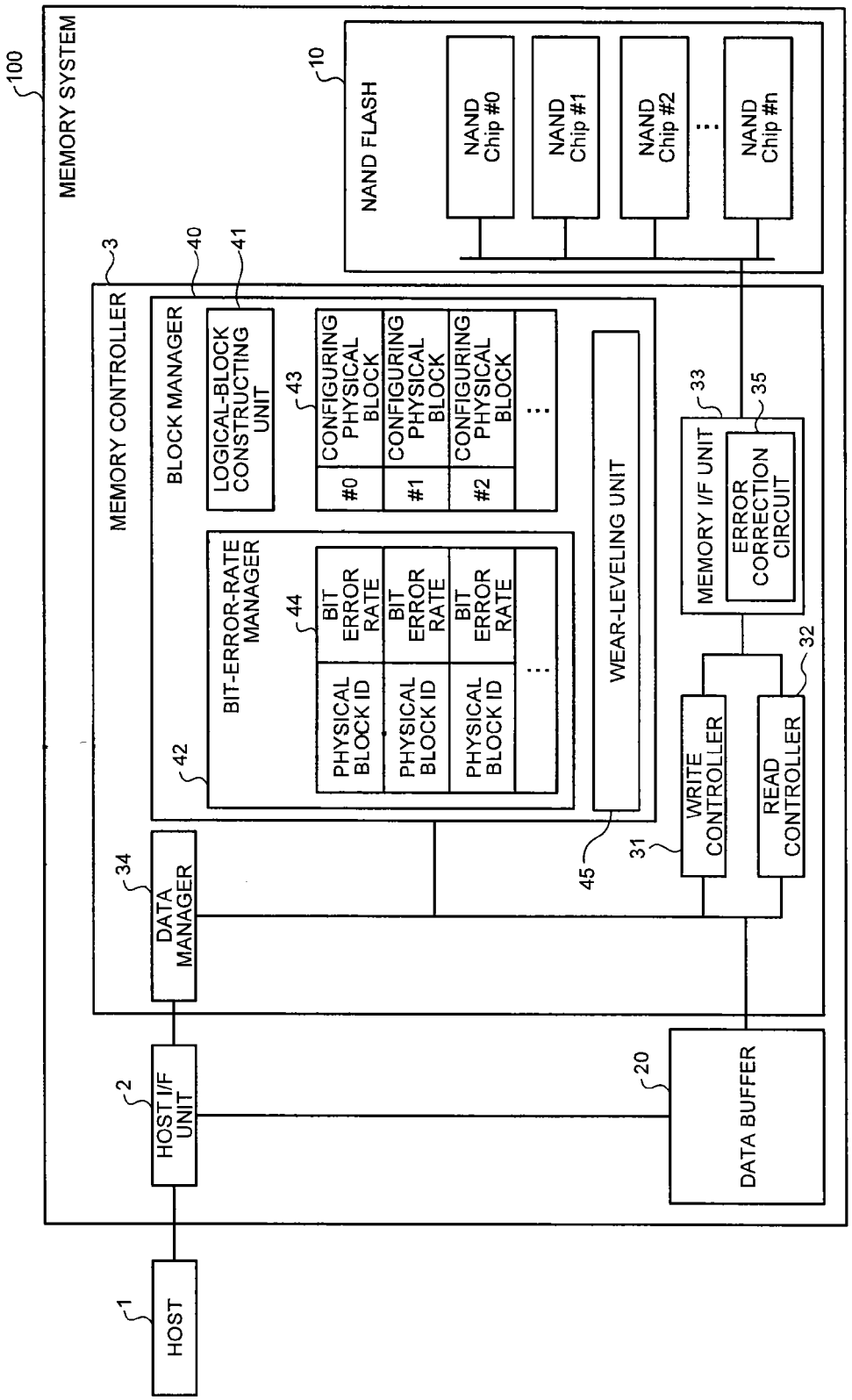
FIG. 9 is a functional block diagram illustrating an internal configuration of a memory system according to a sixth embodiment.

FIG. 9 illustrates an exemplary configuration of a memory system 100 according to a sixth embodiment. In FIG. 9, a wear-leveling unit 45 is added to the block manager 40 in the memory controller 3. The wear-leveling unit 45 executes wear leveling using the bit error rate of each logical block as a leveling target. The wear-leveling unit 45 performs two types of wear leveling.

In a first wear leveling, a logical block with a low bit error rate is used for writing usage with a higher priority than that of a logical block with a high bit error rate. In other words, a first logical block with a low bit error rate is used for data writing with a higher priority than that of a second logical block with a higher bit error rate compared with the first logical block.

For example, a logical block with a bit error rate inversely proportionate to the number of times of rewriting is allocated corresponding to the number of times of rewriting (the rewriting frequency) of the data. That is, for the use of storing data with a large number of times of rewriting, a logical block with a low bit error rate is allocated. For the use of storing data with a medium degree of number of times of rewriting, a logical block with a medium degree of the bit error rate is allocated. For the use of storing data with a small number of times of rewriting, a logical block with a high bit error rate is allocated. In other words, in the case where first data with a high rewriting frequency is written, the first logical block with a low bit error rate is allocated. In the case where second data with a smaller rewriting frequency compared with the first data is written, a second logical block with a higher bit error rate compared with the first logical block is allocated.

In a second wear leveling, data within the first logical block with a bit error rate lower than a threshold value is relocated to another second logical block. The first logical block is released to a free block to reuse the first logical block. This is wear leveling for cold data to which rewrite has not been performed for a long time.

Figure 10:
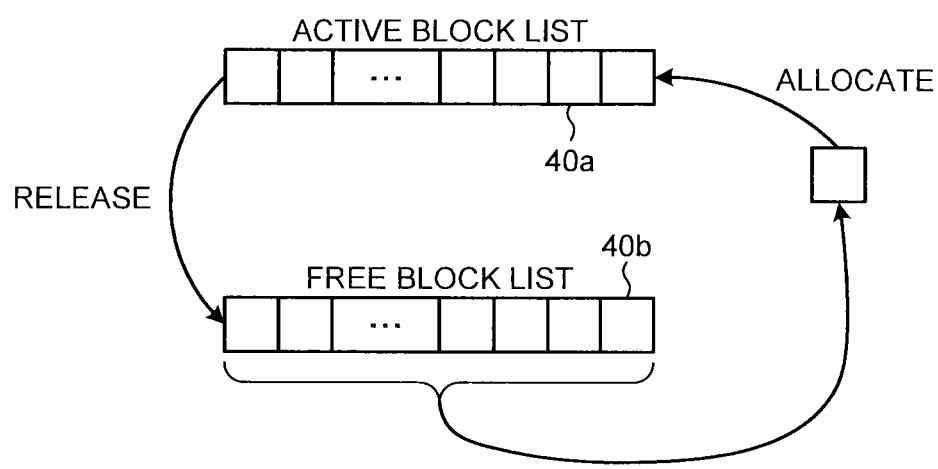
FIG. 10 is a diagram illustrating an active block list and a free block list.

Firstly, the first wear leveling will be described. As illustrated in FIG. 10, the block manager 40 manages the active blocks with an active block list 40a, and manages the free blocks with a free block list 40b. In the free block list 40b, for example, a block ID of the logical block is managed in a FIFO format in the order of release from the active block to the free block. Alternatively, the logical block ID within the free block list 40b may be managed in the order of the bit error rate such that the block ID of the logical block is sorted in descending order corresponding to the bit error rates. There may be two or more each of the free block lists 40b and the active block lists 40a. Additionally, allocation from any free block list 40b to any active block list 40a and release from any active block list 40a to any free block list 40b are also possible.

When the write command is issued from the host 1 or when data is moved among the logical blocks by compaction or similar technique, a data write processing to the logical block occurs. The data written by the host 1 in the former case or the copy of the valid data remaining in the compaction source block in the latter case is written to any of the write target blocks among the active blocks. At this time, in the case where the write target block is full and additional writing of data is not possible any more, it is necessary to allocate a new block from the free block list 40b to the active block list 40a.

When the wear-leveling unit 45 selects a free block of an allocation target, the wear-leveling unit 45 determines a logical block to be selected as the allocation target in the free block list 40b based on the bit error rates of the respective logical blocks stored in the bit-error-rate management table 44 such that a logical block with a low bit error rate is used as a write target with high priority than that of a logical block with a high bit error rate. The identifier of the selected logical block is notified to the block manager 40 that performs allocation to the active block list 40a. In the simplest method, it is only necessary to sort the free block list 40b such that a logical block with a lower bit error rate is output prior to the other logical blocks, and allocate the free block to the active block in the order of the output from the free block list 40b.

Figure 11:
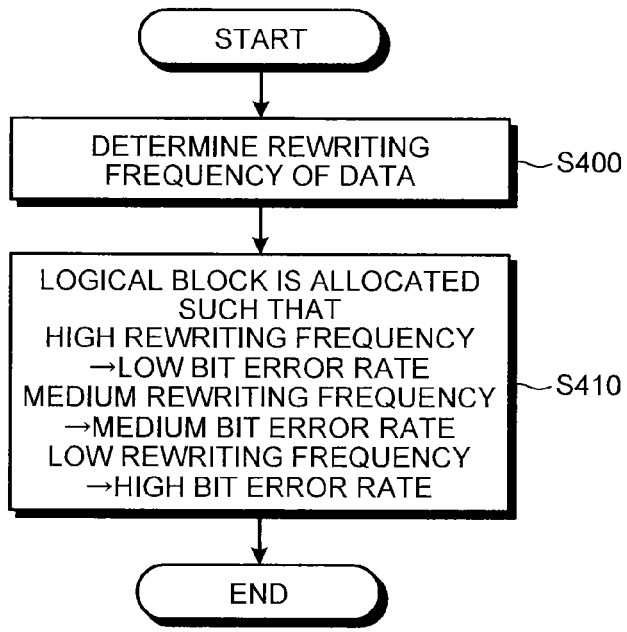
FIG. 11 is a process diagram illustrating a procedure of first wear leveling.

FIG. 11 illustrates a procedure of wear leveling for allocating logical blocks with different bit error rates corresponding to the number of times of rewriting (the rewriting frequency) of the data. When the wear-leveling unit 45 selects the free block of the allocation target, the wear-leveling unit 45 determines the number of times of rewriting (the rewriting frequency) of the data to be written to the free block of the allocation target (in step S400). To determine the number of times of rewriting of the data, for example, the number of times of rewriting may be registered and managed for each logical address (for example, logical block addressing (LBA)) provided by the host 1.

The wear-leveling unit 45 allocates a logical block with a low bit error rate in the case where the number of times of rewriting of the data is large, allocates a logical block with a medium degree of bit error rate in the case where the number of times of rewriting of the data has a medium degree, and allocates a logical block with a high bit error rate in the case where the number of times of rewriting of the data is small (in step S410).

Accordingly, in the case where the number of times of rewriting of the data is large, the logical block with the low bit error rate is allocated. In the case where the number of times of rewriting of the data is small, the logical block with the high bit error rate is allocated. This ensures leveling of the bit error rates of the logical blocks.

Figure 12:
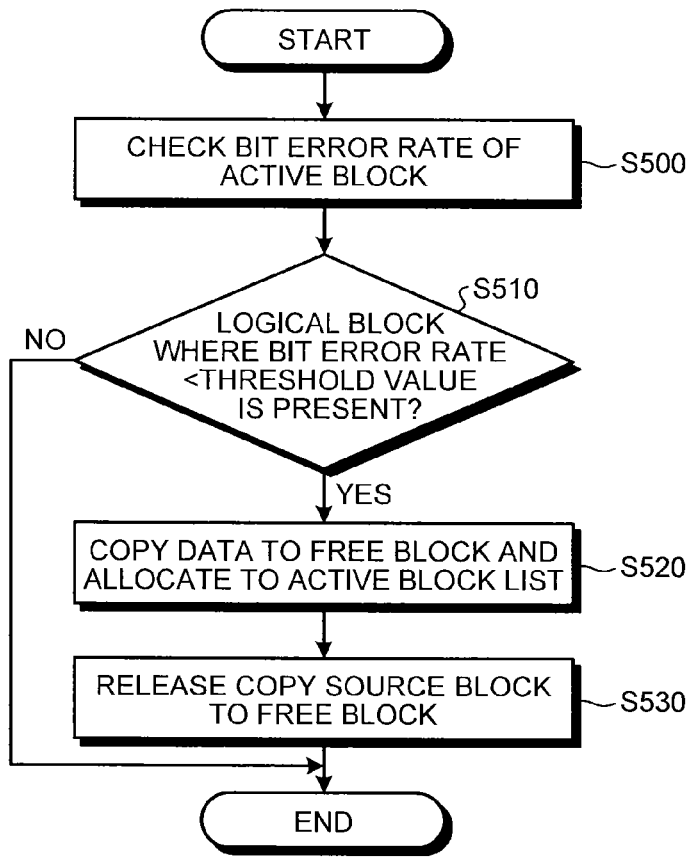
FIG. 12 is a flowchart illustrating a procedure of second wear leveling.

Next, the second wear leveling will be described in accordance with FIG. 12. This second wear leveling is triggered by the movement of the logical block between the lists, for example, allocation of the logical block to the active block list 40a or release of the logical block from the active block list 40a to the free block list 40b, or similar movement.

The wear-leveling unit 45 uses the bit-error-rate management table 44 to check the bit error rate of each logical block included in the active block list 40a (in step S500). In the case where the wear-leveling unit 45 finds a logical block with a lower bit error rate than a threshold value C1 from the active block list 40a (Yes in step S510), the wear-leveling unit 45 copies the data in the logical block to any of the logical blocks in the free block list 40b. The wear-leveling unit 45 moves the logical block of the copy destination from the free block list 40b to the active block list 40a (in step S520). The wear-leveling unit 45 adds the logical block of the copy source from the active block list 40a to the free block list 40b (in step S530).

Here, the threshold value C1 is an index for relatively determining how small the wear degree of this logical block is compared with the other logical blocks, and may be dynamically updated during the operation of the memory system. Examples of the threshold value C1 include, for example, a value obtained by subtracting a fixed value from the average bit error rate of all the logical blocks. Furthermore, the subtracted value may employ not a fixed value, but a value changed by the average bit error rate of all the logical blocks.

Thus, the data within the first logical block with the lower bit error rate than the threshold value C1 is relocated to the other second logical block, so as to release the first logical block to the free block. Accordingly, the first logical block is reused, the cold data to which rewrite has not been performed for a long time is reused, and the bit error rates are leveled.

As described above, in the sixth embodiment, the wear leveling using the bit error rate as a leveling target is performed. Even in the case where there is a large difference in reliability such as bit error rate among the logical blocks, the bit error rates of the respective logical blocks can be leveled. Incidentally, in the case where there is a large difference in reliability such as bit error rate among the logical blocks, the current wear leveling using the number of erasure as a leveling target achieves only suboptimal leveling.

Seventh Embodiment

In a seventh embodiment, until the rest of lifespan of the memory system 100 becomes equal to or less than a certain length after the beginning from the start of use of the memory system 100, the number of erasing times of each logical block is used as a leveling object of the wear leveling. Subsequently, when the rest of lifespan of the memory system 100 has become equal to or less than the certain length, the first wear leveling using the bit error rate as the leveling target is performed. Specifically, when the logical block is allocated from the free block list to the active block list, in the case where a sufficient lifespan of the memory system is remained, an allocation block is selected based on the number of erasure of the logical block. On the other hand, in the case where the lifespan is equal to or less than a certain length, the allocation block is selected based on the bit error rate of the logical block. For predicting the lifespan of the memory system, a method similar to that described in the fifth embodiment can be used.

In the seventh embodiment, until the rest of lifespan of the memory system 100 becomes equal to or less than a certain length after the beginning from the start of use of the memory system 100, the number of erasure of each logical block is used as a leveling object of the wear leveling. Subsequently, when the rest of lifespan of the memory system 100 has become equal to or less than the certain length, the second wear leveling using the bit error rate as a leveling target is performed. That is, when the rest of lifespan of the memory system 100 has become equal to or less than the certain length, the data in a first logical block with a lower bit error rate than a threshold value is relocated to the other second logical block so as to release the first logical block to the free block.

When the number of erasure is leveled, for example, it is only necessary to set the number obtained by subtracting a fixed value from the average number of erasure of all the logical blocks as a threshold value C2 and to set a logical block with the smaller number of erasure than that of the threshold value C2 in the active block list as an object of forced data movement.

At the beginning of the operation of the system, there is a margin of the lifespan of each logical block. Therefore, even suboptimal wear leveling based on the number of erasure is sufficient. When the system reaches the end of its lifespan, the wear leveling transitions to optimal wear leveling that is based on the bit error rate. The number of erasure needs less time and memory amount required for calculation compared with the bit error rate. This reduces the time required for wear leveling at the beginning of the operation of the system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a non-volatile memory that includes a plurality of memory chips, each of the memory chips including a plurality of physical blocks; and
a controller configured to control the non-volatile memory, wherein
the controller includes
a bit-error-rate manager configured to manage information associated with a bit error rate for each of the physical blocks,
a logical-block constructing unit configured to construct a logical block based on the information associated with the bit error rate, the logical block being a collection of the plurality of physical blocks, and
a block manager configured to manage a correspondence between the logical block constructed by the logical-block constructing unit and the plurality of physical blocks.

2. The memory system according to claim 1, wherein
the logical-block constructing unit is configured to construct a first logical block using a plurality of first physical blocks with low bit error rates, and construct a second logical block using a plurality of second physical blocks with higher bit error rates than the bit error rates of the first physical blocks.

3. The memory system according to claim 1, wherein
the logical-block constructing unit is configured to
sort the plurality of physical blocks in an order of the bit error rates for each of the memory chips, and
collect physical blocks with a same sort order from the respective memory chips, so as to construct the logical block.

4. The memory system according to claim 1, further comprising
a wear-leveling unit configured to perform wear leveling using the bit error rate as a leveling object.

5. The memory system according to claim 4, wherein
the wear-leveling unit is configured to use a first logical block with a low bit error rate in data writing with a higher priority than a priority of a second logical block, the second logical block having a higher bit error rate than the bit error rate of the first logical block.

6. The memory system according to claim 4, wherein
the wear-leveling unit is configured to
allocate a first logical block with a low bit error rate in case of writing first data with a high rewriting frequency, and
allocate a second logical block with a higher bit error rate than the bit error rate of the first logical block in case of writing second data with a lower rewriting frequency than the rewriting frequency of the first data.

7. The memory system according to claim 4, wherein
the wear-leveling unit is configured to
relocate data in an active block with a lower bit error rate than a threshold value to another free block, and
release the active block with the lower bit error rate than the threshold value as a free block.

8. The memory system according to claim 1, wherein
the bit-error-rate manager is configured to
set one or a plurality of physical pages as sampling targets in each of the physical blocks, and
obtain a bit error rate of a physical block that includes the physical pages of sampling targets based on bit error rates of the physical pages of the sampling targets.

9. The memory system according to claim 8, wherein
the bit-error-rate manager calculates bit error rates of the physical pages of the sampling targets when data writing to the physical pages of the sampling targets is performed.

10. The memory system according to claim 8, wherein
the bit-error-rate manager is configured to set the physical pages of the sampling targets in a manner that
the physical pages of the sampling targets are distributed in a plurality of physical blocks, and
one physical page of the sampling targets is included in a same logical page.

11. The memory system according to claim 1, wherein
the logical-block constructing unit is configured to construct a logical block based on a bit error rate managed by the bit-error-rate manager after an average bit error rate of the logical blocks exceeds a threshold value.

12. The memory system according to claim 11, wherein
the logical-block constructing unit is configured to collect a same number of physical blocks from each of the memory chips so as to construct a logical block until an average bit error rate of the logical blocks exceeds a threshold value.

13. The memory system according to claim 4, wherein
the wear-leveling unit is configured to perform wear leveling using the bit error rate as a leveling object after an average bit error rate of the logical blocks exceeds a threshold value.

14. The memory system according to claim 13, wherein
the wear-leveling unit is configured to perform wear leveling using a number of erasures as a leveling object until an average bit error rate of the logical blocks exceeds a threshold value.

15. A method for constructing a logical block in a memory system, in which the memory system includes a non-volatile memory that includes a plurality of memory chips, each of the memory chips including a plurality of physical blocks, the method comprising:
a first step of managing information associated with a bit error rate for each of the physical blocks;
a second step of constructing a logical block based on the information associated with the bit error rate, the logical block being a collection of the plurality of physical blocks; and
a third step of managing a correspondence between the constructed logical block and the plurality of physical blocks.

16. The constructing method of a logical block according to claim 15, wherein
the second step includes constructing a first logical block using a plurality of first physical blocks with low bit error rates, and constructing a second logical block using a plurality of second physical blocks with higher bit error rates than the bit error rates of the first physical blocks.

17. The constructing method of a logical block according to claim 15, wherein the second step includes:
sorting the plurality of physical blocks in an order of the bit error rates for each of the memory chips; and
collecting physical blocks with a same sort order from the respective memory chips, so as to construct a logical block.

18. A memory system, comprising:
a non-volatile memory that includes a plurality of memory chips, each of the memory chips including a plurality of physical blocks; and
a controller configured to control the non-volatile memory, wherein
the controller includes a block manager configured to manage a correspondence relationship between the physical block and a logical address, the logical block being a collection of physical blocks from the plurality of memory chips, and
the block manager is configured to manage logical blocks including a first logical block and a second logical block, the first logical block being configured by physical blocks with bit error rates equal to or more than a first bit error rate, the second logical block being configured by physical blocks with bit error rates lower than the first bit error rate.

* * * * *